(12) United States Patent
Lim et al.

(10) Patent No.: US 7,532,902 B2
(45) Date of Patent: May 12, 2009

(54) METHOD AND APPARATUS FOR CELL SEARCH IN WIRELESS COMMUNICATION SYSTEM

(75) Inventors: In-Chun Lim, Seoul (KR); Tae-Gon Kim, Seoul (KR); Yun-Sang Park, Suwon-si (KR); Bong-Gee Song, Seongnami-si (KR)

(73) Assignee: Samsung Electronics Co., Ltd (KR)

( * ) Notice: Subject to any disclaimer, the term of this patent is extended or adjusted under 35 U.S.C. 154(b) by 345 days.

(21) Appl. No.: 11/312,172

(22) Filed: Dec. 20, 2005

(65) Prior Publication Data

US 2006/0133321 A1    Jun. 22, 2006

(30) Foreign Application Priority Data

Dec. 22, 2004    (KR)    .................. 10-2004-0110743

(51) Int. Cl.
H04W 68/00    (2006.01)
H04J 11/00    (2006.01)
H04W 4/00    (2006.01)
(52) U.S. Cl. .................. 455/458; 370/203; 370/331
(58) Field of Classification Search ................. 455/458; 370/331, 203
See application file for complete search history.

(56) References Cited

U.S. PATENT DOCUMENTS

2004/0229615 A1    11/2004    Agrawal
2004/0246998 A1    12/2004    Ma et al.
2006/0114812 A1*   6/2006    Kim et al.    .................. 370/206
2008/0039107 A1*   2/2008    Ma et al.    .................. 455/450

FOREIGN PATENT DOCUMENTS

JP    2004-207983    7/2004

OTHER PUBLICATIONS

Part 16: Air Interface for Fixed Broadband Wireless Access Systems, IEEE Standard for Local and Metropolitan Area Networks, IEEE Std. 802.16, Oct. 1, 2004, p. 496.
Kwang Soon Kim et al., A Preamble-Based Cell Searching Technique for OFDM Cellular Systems, Vehiclular Technology Conference, Oct. 6-9, 2003.
Jason Hou et al., "Preamble Sequence for Fast Cell Search, Low Computational Complexity, and Low PAPR", IEEE 802.16 Broadband Wireless Access Working Group, Aug. 28, 2004.
Jason Hou et al., "Preamble Sequence for Fast Cell Search, Low Computational Complexity, and Low PAPR", IEEE 802.16 Presentation Submission Template (Rev.8.3.), Aug. 28, 2004.

* cited by examiner

*Primary Examiner*—Nick Corsaro
*Assistant Examiner*—Shannon R Brooks
(74) *Attorney, Agent, or Firm*—The Farrell Law Firm, PC (57) ABSTRACT

Disclosed is an apparatus and a method for performing a cell search in a wireless communication system. A subscriber station calculates the power of subcarriers according to their positions in a preamble signal of a frequency domain and identifies a segment of a cell to which the subscriber station belongs. Then, the subscriber station correlates PN sequences, which correspond to the segment of the cell that has been identified, with the preamble signal of the frequency domain. Therefore, the number of calculations for determining correlation values in a cell search is remarkably reduced.

14 Claims, 8 Drawing Sheets

METHOD AND APPARATUS FOR CELL SEARCH IN WIRELESS COMMUNICATION SYSTEM

PRIORITY

This application claims to the benefit under 35 U.S.C. 119(a) of an application entitled "Method And Apparatus For Cell Search In Wireless Communication System" filed in the Korean Intellectual Property Office on Dec. 22, 2004 and assigned Serial No. 2004-110743, the contents of which are incorporated herein by reference.

BACKGROUND OF THE INVENTION

1. Field of the Invention

The present invention relates to a method and an apparatus for performing a cell search in a wireless communication system.

2. Description of the Related Art

A typical wireless communication system includes at least one cell to provide a communication service to each subscriber station (mobile terminal). Each cell may be divided into a predetermined number of segments according to the number of subscribers. A subscriber station must recognize the cell to which the subscriber station belongs or recognize the segment to which the subscriber station belongs in the cell. In order to recognize the cell or the segment in the cell to which the subscriber station belongs, the subscriber station analyzes a signal broadcasted from the wireless communication system.

Figure 1:
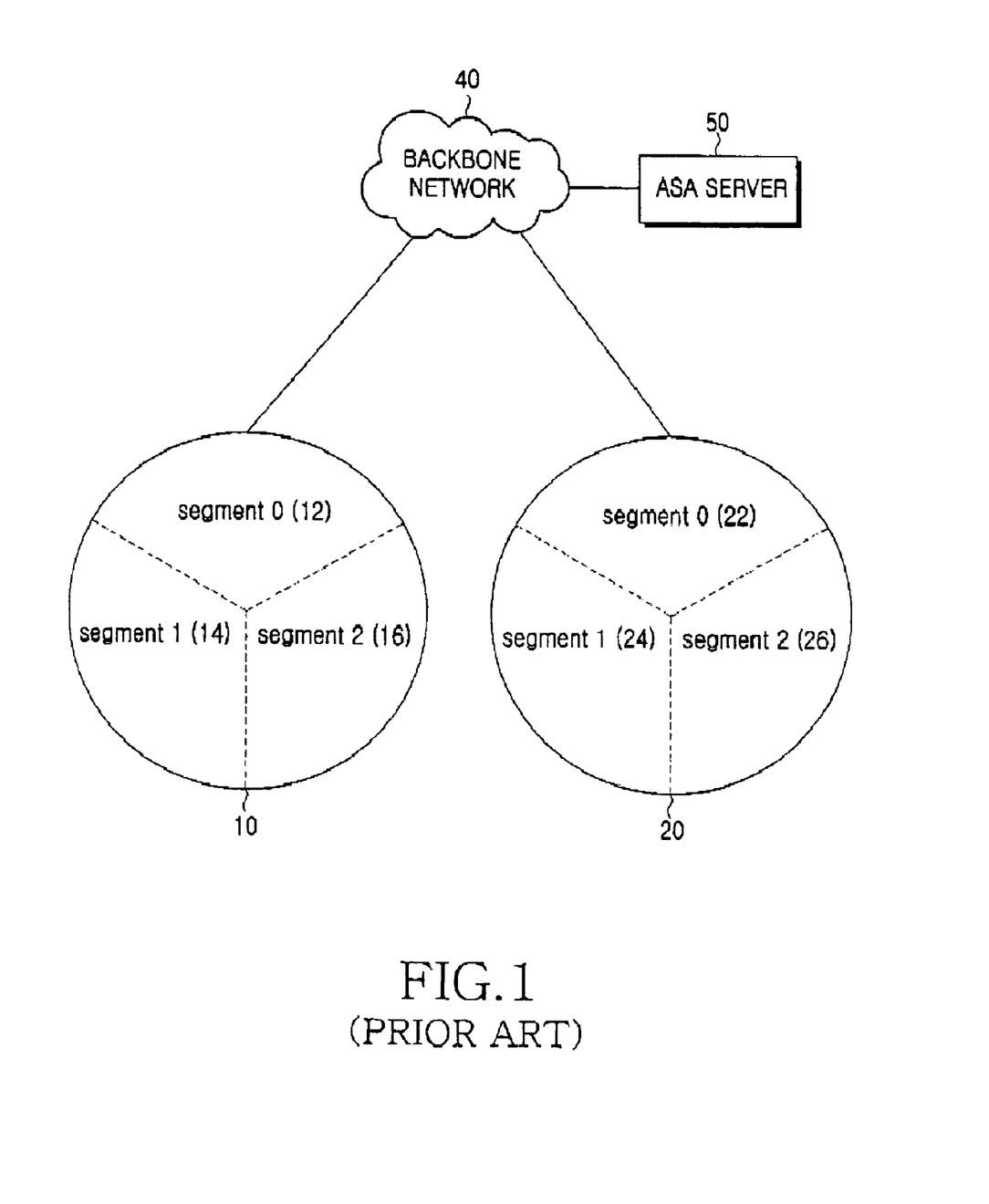
FIG. 1 is a block diagram illustrating a construction of a wireless communication system employing the OFDMA scheme.

Recently, a wireless communication system employing an orthogonal frequency division multiple access (OFDMA) scheme has been proposed in Institute of Electrical and Electronics Engineers (IEEE) 802.16 standardization group (the IEEE 802.16 standard) in order to transmit data at a high speed. FIG. 1 is a block diagram illustrating a construction of a wireless communication system employing the OFDMA scheme. A subscriber station (not shown) having a mobility is located in a cell 10 or 20 and communicates with a backbone network 40. The backbone network 40 is connected to an authentication and service authorization server (ASA) 50 which provides authentication and service authorization to the subscriber station (SS).

A preamble signal broadcasted from an OFDMA system according to the IEEE 802.16e standard, provides information for performing a cell search and initial synchronization. The initial synchronization is estimated from a repeated pattern contained in the preamble signal. In order to generate such a preamble signal having a repeated pattern in a multi-carrier system such as the OFDMA system, it is necessary to periodically insert a zero into a transmission signal of a frequency domain and to change the transmission signal into a time domain signal using an inverse fast Fourier transform (IFFT) before the transmission signal is transmitted.

Figure 2:
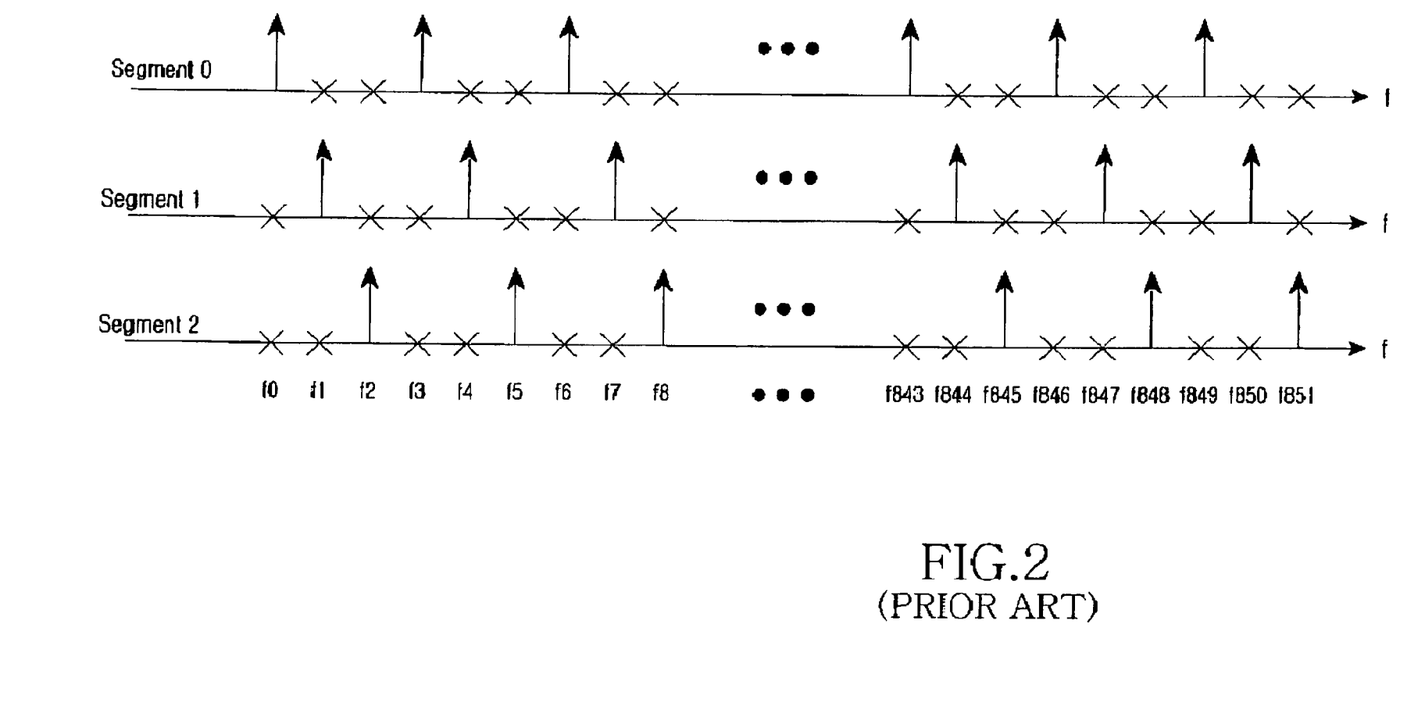
FIG. 2 is a view showing an example of frequency use in a wireless communication system having a multi-sector environment.

FIG. 2 is a view showing an example of frequency use in a wireless communication system having a multi-sector environment. A preamble signal is obtained by inserting a signal into only one of three subcarriers and zero into the other two of the three subcarriers in a frequency domain and then performing IFFT for the three resultant subcarriers, so that the preamble signal includes three time repetition of a predetermined signal pattern in a time domain.

Meanwhile, as described above, a cell in the wireless communication system can be divided into multiple segments. The preamble signal includes a cell ID and 96 pseudo-noise (PN) sequences distinguished according to segments as information for a cell search. Each PN sequence includes 284 bits and is modulated to a frequency having a three interval in a frequency domain. From among the every three subcarriers, the position of the bit into which the signal is inserted is determined according to segments. From among 96 PN sequences, PN sequences of # 0 to 31 correspond to segment #0 (12), # 0 12 PN sequences of # 32 to 63 correspond to segment #1 (14), and PN sequences of # 64 to 95 correspond to segment #2 (16). As used above, 0, 1, and 2 refer to respective segment numbers and 12, 14, and 16 are reference numbers corresponding to their respective segment numbers.

The respective cells and segments are distinguished from each other by preamble signals made using a scheme as described above. Finding a cell to which the subscriber station belongs is identical to finding the preamble signal of the cell. The subscriber station converts the preamble signal into a signal of a frequency domain by the fast Fourier transform (FFT). The preamble signal of the frequency domain is subjected to a cross correlation calculation process with PN sequences. Herein, the PN sequence having the largest correlation value is determined as the PN sequence of a current cell.

Figure 3:
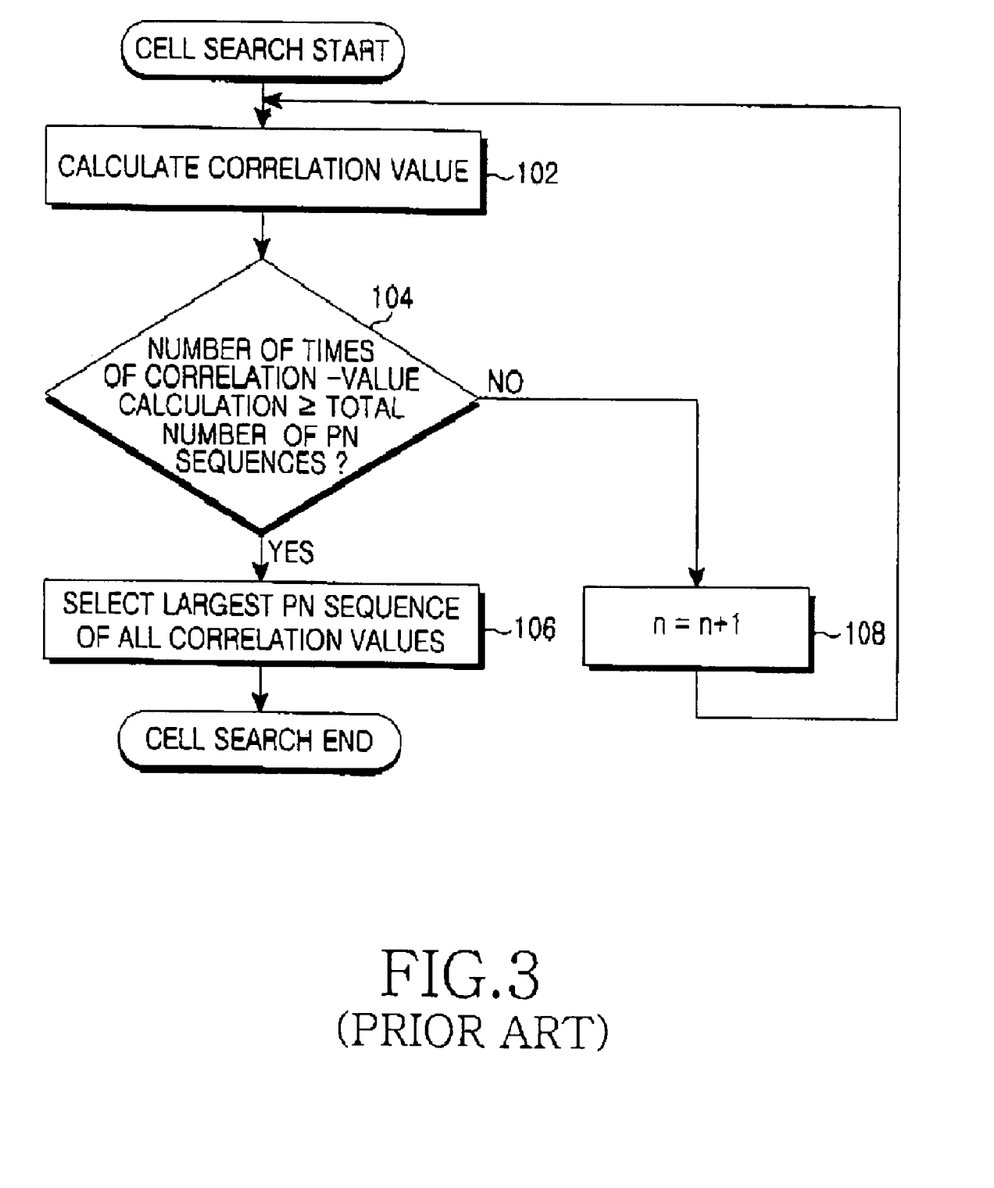
FIG. 3 is a flowchart illustrating a conventional procedure for performing a cell search.

FIG. 3 is a flowchart illustrating a conventional procedure for a cell search. When a subscriber station receives a preamble signal, the subscriber station obtains a correlation value by correlating known PN sequences with the preamble signal in step 102. In this case, since the subscriber station must know the segment to which the subscriber station belongs in the cell to which the subscriber station belongs, the subscriber station correlates the preamble signal with the whole PN sequences. Then, the subscriber station determines whether or not the number of times of correlation-value calculation is equal to or more than the number of the whole PN sequences in step 104. As a result, when the number of times of correlation-value calculation is less than the number of the whole PN sequences, the subscriber station proceeds to step 108 and increases the number of times of correlation-value calculation by one and then returns to step 102. The subscriber station correlates the preamble signal with the whole PN sequences in the above-mentioned way by turns. Thereafter, when the number of times of correlation-value calculation is equal to or greater than the number of the whole PN sequences, the subscriber station proceeds to step 106. In step 106, the subscriber station selects the PN sequence having the largest correlation value from among the whole correlation values, for example, from among 96 correlation values.

Figure 4:
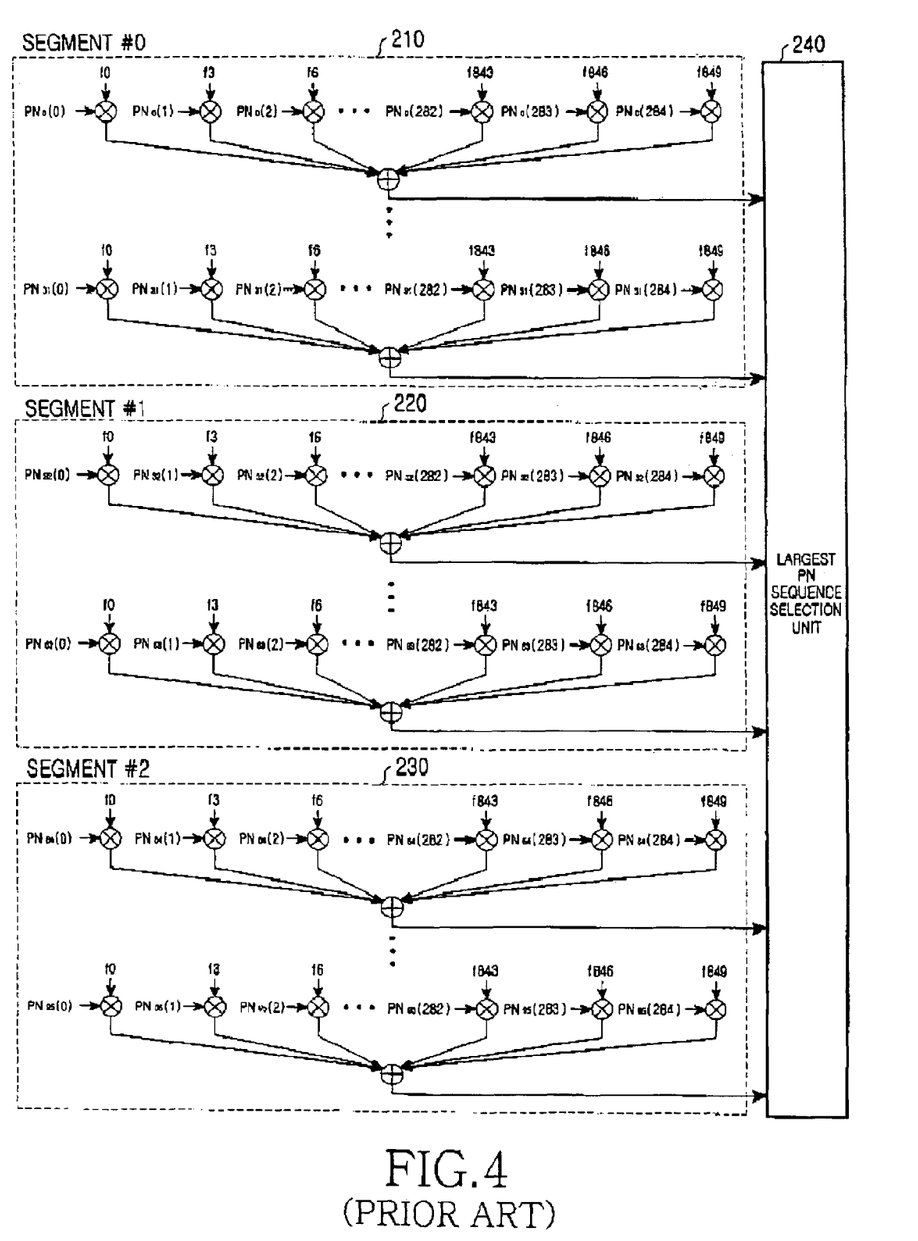
FIG. 4 is a block diagram illustrating the conventional cell search apparatus.

FIG. 4 is a block diagram illustrating the conventional cell search apparatus. The cell search apparatus shown in FIG. 4 illustrates that the amount of calculations required to obtain the largest correlation value, for the purpose of finding the segment to which the subscriber station belongs in the cell to which the subscriber station belongs. That is, the cell search apparatus correlates all of the known PN sequences with the preamble signal of the frequency domain.

The cell search apparatus includes a first block 210 for correlating 32 PN sequences corresponding to segment #0, a second block 220 for correlating 32 PN sequences corresponding to segment #1, and a third block 230 for correlating 32 PN sequences corresponding to segment #2. In addition, the cell search apparatus includes a largest PN sequence selection unit 240 for selecting the PN sequence having the largest correlation value from among correlation values provided from the blocks 210, 220 and 230. As described above, the conventional cell search apparatus must correlate all of the known PN sequences with a preamble signal of the frequency domain.

According to such a conventional cell search apparatus, it is necessary to correlate all PN sequences corresponding to segments of each cell with a preamble signal, so that it takes an excessive amount of time to perform a cell search.

SUMMARY OF THE INVENTION

Accordingly, the present invention has been made to solve the above-mentioned problems occurring in the prior art, and an object of the present invention is to provide an apparatus and method for performing a cell search, which can reduce the amount of calculation and time required for performing a cell search in a wireless communication system.

To accomplish this object, in accordance with one aspect of the present invention, there is provided a cell search apparatus in a wireless communication system, the cell search apparatus including a subcarrier power calculation unit for calculating power of subcarriers according to positions of a preamble signal of a frequency domain and identifying a segment of a cell, to which a subscriber station belongs, and a correlation unit for performing a correlation operation between a predetermined number of PN sequences corresponding to the identified segment of the cell and the preamble signal of the frequency domain, thereby outputting correlation values. In accordance with another aspect of the present invention, there is provided a method for performing a cell search in a wireless communication system, the method including the steps of calculating power of subcarriers according to positions in a preamble signal of a frequency domain and identifying a segment to which a subscriber station belongs, and correlating a predetermined number of PN sequences corresponding to the identified segment in a cell.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, one preferred embodiment of the present invention will be described with reference to the accompanying drawings. In the following description of the embodiments of the present invention, a detailed description of known functions and configurations incorporated herein will be omitted when it may obscure the subject matter of the present invention.

Figure 5:
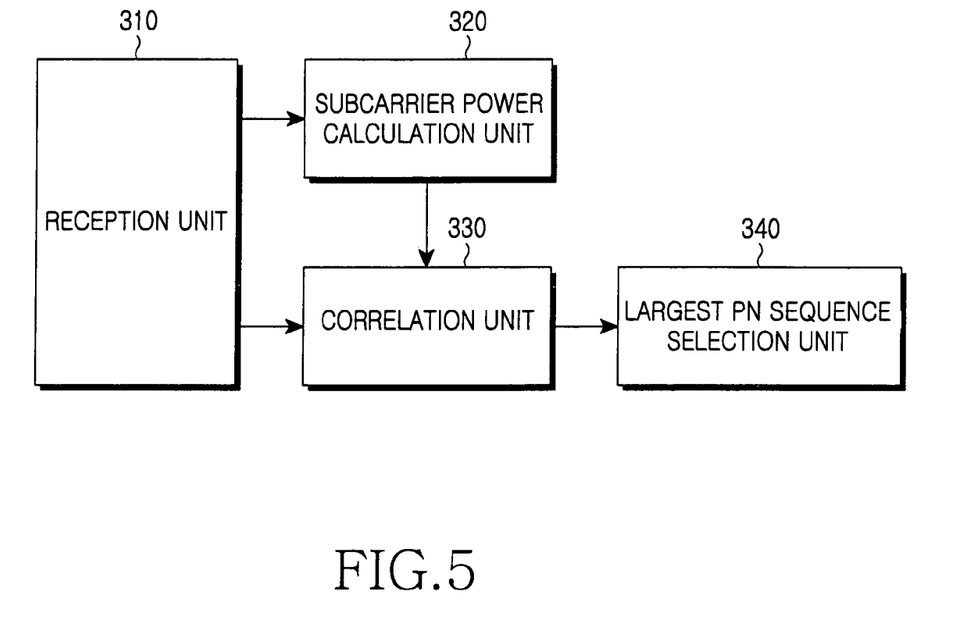
FIG. 5 is a block diagram illustrating a construction of a cell search apparatus according to an embodiment of the present invention.
Figure 6:
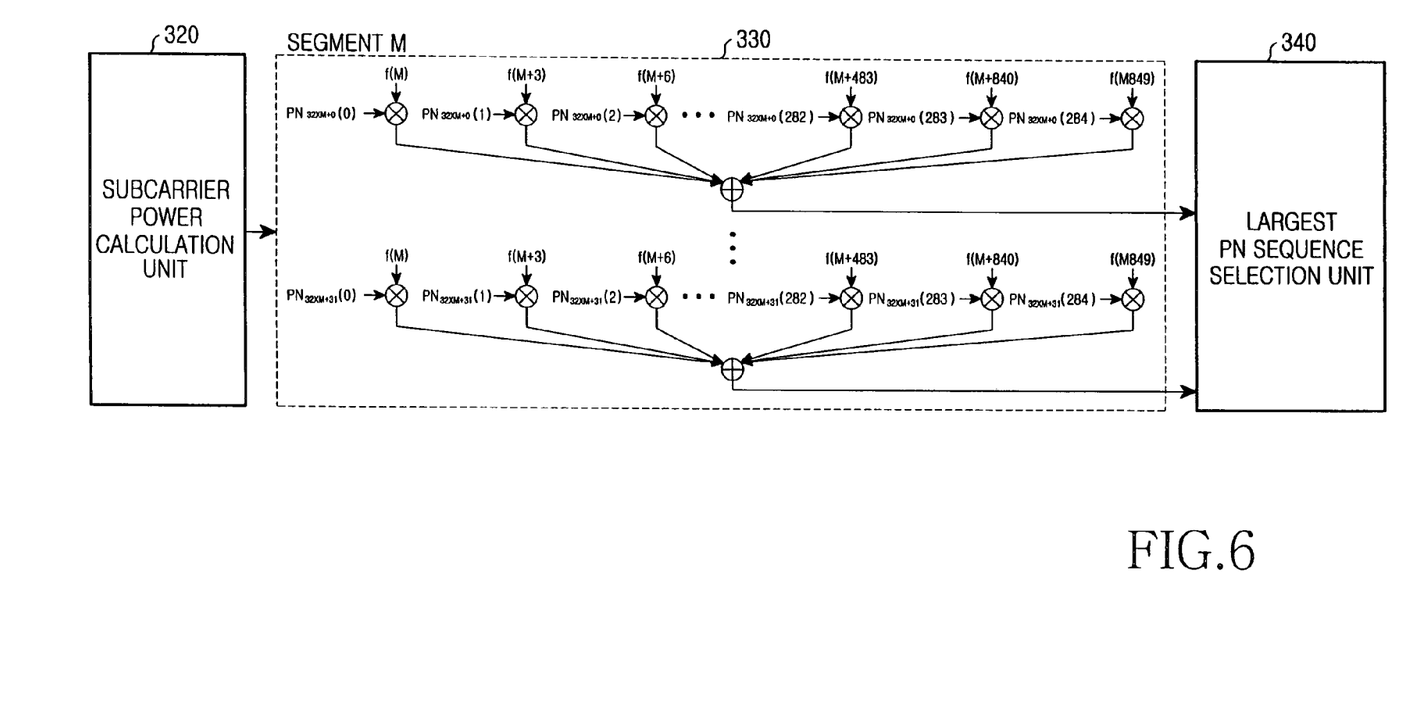
FIG. 6 is a detailed block diagram of a portion of the cell search apparatus shown in FIG. 5.

FIG. 5 is a block diagram illustrating a construction of a cell search apparatus according to an embodiment of the present invention, and FIG. 6 is a detailed block diagram of a portion of the cell search apparatus shown in FIG. 5.

Referring to FIG. 5, the cell search apparatus includes a reception unit 310 for receiving a preamble signal and converting the received preamble signal into a preamble signal of a frequency domain, a subcarrier power calculation unit 320 for calculating the power of a subcarrier, a correlation unit 330 for correlating the preamble signal with each PN sequence, and a largest PN sequence selection unit 340 for selecting the PN sequence corresponding to the largest correlation value from among correlation values.

To be specific, in a preamble signal, a signal is inserted into one subcarrier of every three consecutive subcarriers and zero is inserted into the other two consecutive subcarriers in the frequency domain. Therefore, the preamble signal has a form in which a predetermined signal pattern is repeated three times in a time domain. However, when a service call area is divided into multiple segment areas in a wireless communication system, the respective segments use different subcarriers from each other in the frequency domain. Since each subscriber station belongs to one segment from among multiple segments in a cell, each subscriber station receives a preamble signal which contains a signal in one subcarrier of every a predetermined number of subcarriers in the frequency domain. Of course, the repeated pattern may be replaced by a twice repeated pattern, a four-times repeated pattern, a six times repeated pattern or the like.

According to an embodiment of the present invention, when the cell search apparatus of a subscriber station receives a preamble signal, the cell search apparatus calculates the power of each subcarrier according to the positions of the subcarriers in the frequency domain of the preamble signal.

For example, in the case in which a signal is inserted into one subcarrier of every three consecutive subcarriers in the frequency domain of a preamble signal, when the cell search apparatus knows the position of the subcarrier loading the signal from among the three consecutive subcarriers, the cell search apparatus can find the segment to which the cell search apparatus belongs in a cell. Therefore, the cell search apparatus sums up the power of subcarriers at the same turn in every three consecutive subcarriers for each turn. Then, the cell search apparatus determines that the segment corresponding to the position of the largest sum is the segment to which the cell search apparatus belongs.

To this end, when the reception unit 310 of the cell search apparatus receives a preamble signal, the reception unit 310 converts the preamble signal of the time domain into a preamble signal of the frequency domain using a fast Fourier transform (FFT), and then outputs the preamble signal of the frequency domain to the subcarrier power calculation unit 320. The subcarrier power calculation unit 320 calculates data powers of subcarriers at each position in every three subcarriers for each turn, as shown in Equation 1 below.

$$P_{3k} = \sum_{k=0}^{283} \sqrt{I(3k)^2 + Q(3k)^2}$$

Equation 1

$$P_{3k+1} = \sum_{k=0}^{283} \sqrt{I(3k+1)^2 + Q(3k+1)^2}$$

-continued
$$P_{3k+2} = \sqrt{I(3k+2)^2 + Q(3k+2)^2}$$

Herein, $P_{3k}$, $P_{3k+1}$ and $P_{3k+2}$ represent the power of $3k^{th}$, $(3k+1)^{th}$ and $(3k+2)^{th}$ subcarrier data, respectively, and I and Q represent I-channel data and Q-channel data, respectively. The subcarrier power calculation unit 320 calculates power according to the positions of the respective subcarriers of the frequency domain as shown in Equation 1, and then determines a segment having the largest power to notify the correlation unit 330 of the determined segment. Also, as another embodiment, it is possible that the subcarrier power calculation unit 320 calculates power, and then reports the calculated power to the correlation unit 330 so that the correlation unit 330 can determine the segment having the largest power.

The correlation unit 330 correlates a predetermined number of PN sequences corresponding to the segment having the largest power with the received preamble signal. For example, since there is a predetermined number of PN sequences per segment, the correlation unit 330 calculates correlation values with respect to the predetermined number of PN sequences. Equation 2 shows calculation formulas for calculating correlation values according to each segment, in the case in which a signal is inserted into one subcarrier of every three consecutive subcarriers in the frequency domain of a preamble signal and a PN sequence includes 284 bits.

value. Also, In this case, it is natural that the correlation values should be calculated with respect to only a predetermined number of PN sequences corresponding to the segment to which the subscriber station belongs.

As still another embodiment of the present invention, it may also be considered to estimate a frequency offset of integer times. When a frequency offset ($\Delta f$) of integer times exists, a signal corresponding to a $K^{th}$ subcarrier moves into a $(K+\Delta f)$ subcarrier. Therefore, it is necessary that the correlation unit 330 considers the integer time frequency offset when obtaining a correlation value between a received preamble signal and a PN sequence. When an integer times frequency offset is estimated in addition, it is performed to obtain a combination having the largest correlation value from among combinations between the integer time frequency offset and PN sequences corresponding to a selected segment. In this case, when the frequency offset of integer times has an estimation range of $-F$ to $F$, the conventional cell search technique requires that the total number of combinations between PN sequences and the integer time frequency offset, from which correlation values must be calculated, is "the number of all available PN sequences×(2F+1)". In contrast, in the same case, the present invention requires that the total number of combinations between PN sequences and the integer time frequency offset, from which correlation values must be calculated, is "the number of PN sequences corresponding to a segment to which the subscriber station belongs×(2F+1)", Equation 2
$$\text{Correlation value} \begin{cases} \sum_{n=0}^{31}\sum_{k=0}^{283} PN_n(k)PR(3k) & (\text{MAX Power} = P_{3k}) \\ \sum_{n=0}^{31}\sum_{k=0}^{283} PN_{n+32}(k)PR(3k+1) & (\text{MAX Power} = P_{3k+1}) \\ \sum_{n=0}^{31}\sum_{k=0}^{283} PN_{n+64}(k)PR(3k+2) & (\text{MAX Power} = P_{3k+2}) \end{cases}$$

The correlation unit 330 obtains correlation values by performing a correlation operation between the received preamble signal and the predetermined number of PN sequences corresponding to the segment to which the subscriber station belongs as shown in Equation 2, and then outputs the obtained correlation values to the largest PN sequence selection unit 340.

As another embodiment of the present invention, it may be considered that a timing offset caused by a channel exists. When a timing offset exists, the correlation unit 330 calculates correlation values using a differential signal of an original signal, so as to minimize an effect which phase displacement occurring in a preamble signal having undergone the FFT exerts upon the determination for the largest correlation thereby reducing the amount of calculation as compared with the conventional cell search technique.

The correlation values obtained by such a way are output to the largest PN sequence selection unit 340. Then, the PN sequence corresponding to the largest correlation value is found by the largest PN sequence selection unit 340, so that it is possible to acquire the value of a cell ID.

For example, when a signal is inserted into one subcarrier of every three consecutive subcarriers in the frequency domain of the preamble signal and a PN sequence includes 284 bits, the largest PN sequence selection unit 340 selects a PN sequence corresponding to the largest correlation value from among correlation values using Equation 3 below.

Equation 3
$$PN \text{ Sequence} = \text{MAX}_n \sum_{n=0}^{31}\sum_{k=0}^{283} PN_n(k)PR(3k) \quad (\text{MAX Power} = P_{3k})$$

$$\text{MAX}_{n+32} \sum_{n=0}^{31}\sum_{k=0}^{283} PN_{n+32}(k)PR(3k+1) \quad (\text{MAX Power} = P_{3k+1})$$

-continued $$\text{MAX}_{n+64} \sum_{n=0}^{31} \sum_{k=0}^{283} PN_{n+64}(k)PR(3k+2) \quad (\text{MAX Power} = P_{3k+2})$$

Herein, PR(3k), PR(3k+1) and PR(3k+2), represent $3K^{th}$, $(3K+1)^{th}$ and $(3K+2)^{th}$ subcarrier preamble signal values, respectively, and $PN_n(k)$ represents the value of a $k^{th}$ bit in an $n^{th}$ PN sequence.

Therefore, the cell search apparatus can quickly find the PN sequence of a cell to which the cell search apparatus belongs, with a smaller calculation amount than that in the prior art.

FIG. 6 is a detailed block diagram illustrating an example of a construction of the correlation unit in the cell search apparatus according to an embodiment of the present invention. The correlation unit shown in FIG. 6 shows the calculations required to obtain correlation values, so that a subscriber station can find the segment to which the subscriber station belongs in a cell to which the subscriber station belongs. The correlation unit according to an embodiment of the present invention correlates PN sequences, which corresponds to a segment to which the subscriber station belongs, with the preamble signal of the frequency domain.

As shown in FIG. 6, the correlation unit 330 in the cell search apparatus is constructed to correlate PN sequences (e.g., 32 PN sequences) belonging to a predetermined segment M with the preamble signal of the frequency domain. As described above, each PN sequence contains 284 bits. Therefore, 284 bits of each PN sequence correlate with the preamble signal of the frequency domain. In this case, the preamble signal of the frequency domain correlating with a PN sequence corresponds to subcarriers located at a position into which a signal is loaded to correspond to the segment identified by a result value of the subcarrier power calculation unit. Such a correlation operation with respect to each PN sequence is performed with respect to all PN sequences corresponding to the segment M.

Meanwhile, the construction of the correlation unit according to the present invention may change according to the quantity of PN sequences and the preamble signal of the frequency domain which correlate with each other at once. Therefore, it goes without saying that the present invention is not limited by the construction shown in FIG. 6.

Figure 7:
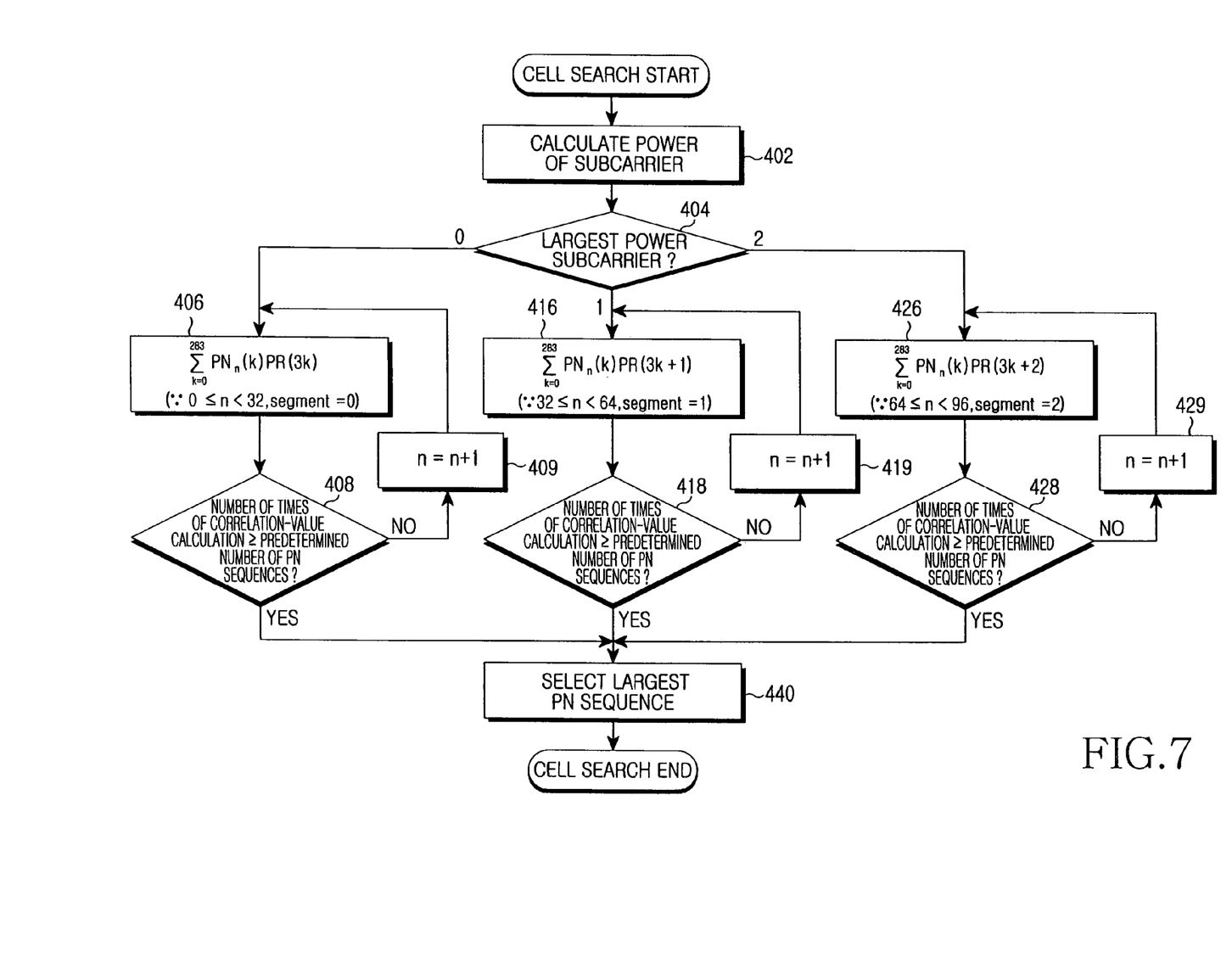
FIG. 7 is a flowchart illustrating a cell search method according to an embodiment of the present invention.

FIG. 7 is a flowchart illustrating a cell search method according to an embodiment of the present invention.

When the cell search apparatus begins a cell search, the cell search apparatus first calculates the power of subcarriers in step 402. To be specific, as described above, the cell search apparatus can identify the segment to which the cell search apparatus belongs in a cell, when it understands the position of the subcarrier loading a signal in every a predetermined number of consecutive subcarriers. To this end, the cell search apparatus sums up the power of subcarriers positioned at the same turn in every three consecutive subcarriers for each turn, thereby obtaining each power of Pk, (Pk+1) and (Pk+2) subcarriers. Then, the cell search apparatus determines that the segment (e.g., segment #1, #2 or #3 as shown) corresponding to the position of subcarriers having the largest power is the segment to which the cell search apparatus belongs in step 404. Therefore, for example, when a signal is inserted into one subcarrier of every three consecutive subcarriers in the frequency domain of a preamble signal, the cell search apparatus can identify the segment to which the cell search apparatus belongs in a cell, when it understands the position of the subcarrier loading a signal from among three consecutive subcarriers. In this case, the cell search apparatus sums up the power of subcarriers positioned at the same turn in every three consecutive subcarriers for each turn. Then, the cell search apparatus determines that the segment corresponding to the position of the largest sum is the segment to which the cell search apparatus belongs.

Thereafter, the cell search apparatus proceeds to any one of steps 406, 416 and 426 according to the segment to which the cell search apparatus belongs. In each of steps 406, 416 and 426, the cell search apparatus performs a correlation operation between a received preamble signal of the frequency domain and a predetermined number of PN sequences corresponding to the segment to which the cell search apparatus belongs, as shown in Equation 2.

According to another embodiment of the present invention, in each of steps 406, 416 and 426, in consideration of a timing offset caused by a channel, the cell search apparatus may calculate correlation values using a differential signal of an original signal, so as to minimize an effect which phase displacement occurring in a preamble signal having undergone the FFT exerts upon the determination for the largest correlation value.

Meanwhile, when a frequency offset ($\Delta f$) of integer times exists, a signal corresponding to a $K^{th}$ subcarrier moves into a (K+$\Delta f$) subcarrier. Therefore, according to still another embodiment of the present invention, the cell search apparatus may consider such a frequency offset when obtaining a correlation value between a received preamble signal and a PN sequence. When such an integer time frequency offset is estimated in addition, the cell search apparatus searches for a combination having the largest correlation value from among combinations between the integer time frequency offset and PN sequences corresponding to a selected segment.

Referring again to FIG. 7, in each of steps 408, 418 and 428, the cell search apparatus judges whether correlation calculations for all of the predetermined number of PN sequences corresponding to the segment to which the cell search apparatus belongs has been performed. When correlation calculations for all of the predetermined number of PN sequences corresponding to the segment to which the cell search apparatus belongs are not completed, the cell search apparatus proceeds to step 409, 419 or 429 and increases the number of times of correlation-value calculation by one and then returns to each of steps 406, 416 and 426.

In such a way, the cell search apparatus correlates the preamble signal with the predetermined number of PN sequences corresponding to the segment in turn, and proceeds to step 440 when the number of times of correlation-value calculation is equal to or more than the predetermined number of the PN sequences of each segment. In step 440, the subscriber station selects the PN sequence (the largest PN sequence) corresponding to the largest correlation value from among a predetermined number of correlation values (e.g., 32 correlation values). Selecting the largest correlation value (and its corresponding PN sequence) enables the acquisition of a corresponding cell ID, so that both the cell ID of the cell and the segment in which the subscriber station is located are found, thereby ending the cell search procedure.

As described above, since the cell search procedure according to the present invention is performed in two separate steps, it is possible to reduce the number of calculations required for performing a cell search. Also, according to the present invention, although a timing offset and/or an integer time frequency offset exists, it is possible to perform the correlation-value calculation procedure for performing a cell search with fewer calculations.

Figure 8:
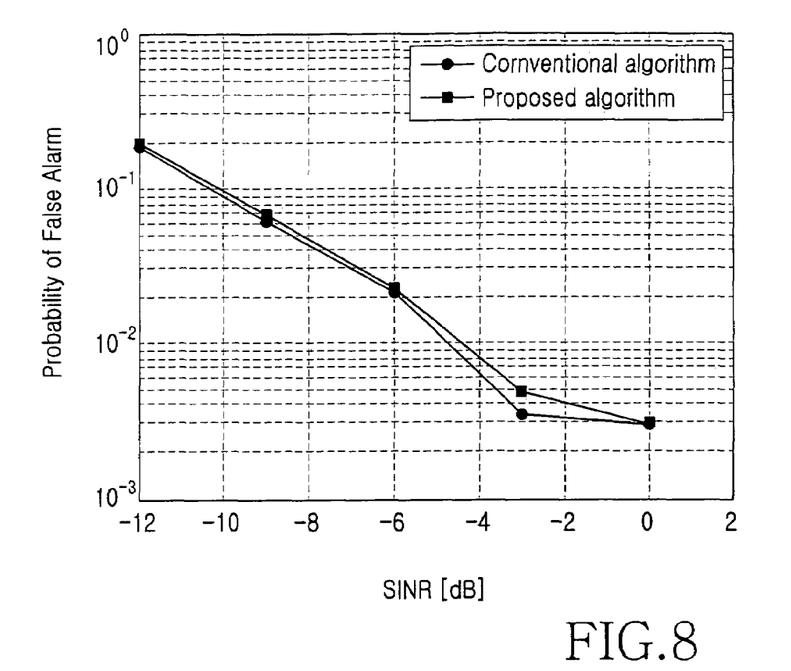
FIGS. 8 and 9 are graphs illustrating performance difference between the present invention and the prior art.
Figure 9:
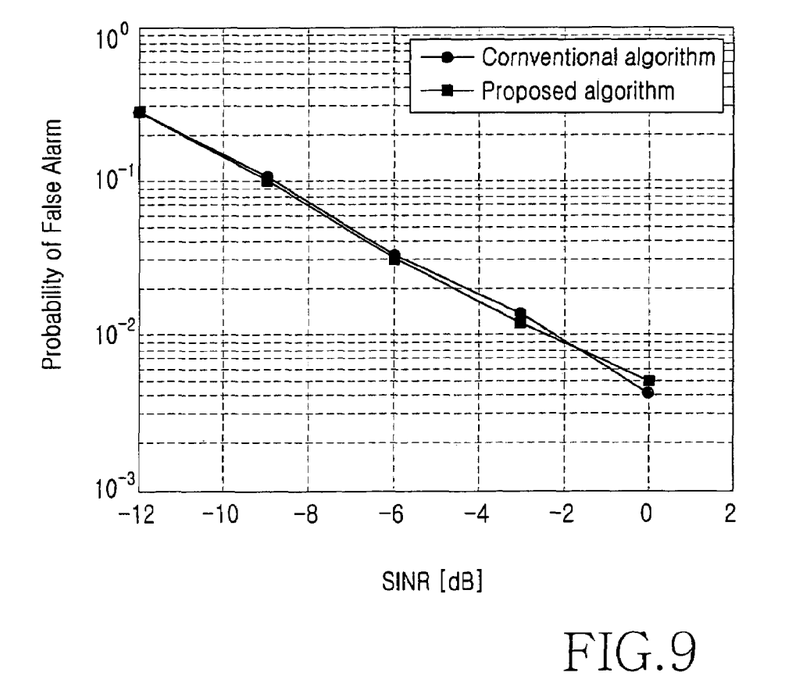

The performance difference between the present invention and the prior art is shown in FIGS. 8 and 9. FIG. 8 is a graph illustrating the performance difference between the conventional cell search technique tested at a speed of 3 km/h and the proposed two-step cell search technique tested at a speed of 60 km/h, on the basis of an ITU-R Pedestrian B channel model. FIG. 9 is a graph illustrating the performance difference between the conventional cell search technique tested at a speed of 3 km/h and the proposed two-step cell search technique tested at a speed of 60 km/h, on the basis of an SUI-5 channel model. Referring to FIGS. 8 and 9, the conventional cell search technique and the proposed two-step cell search technique have similar error probabilities in both models. Therefore, it can be understood that the two-step cell search technique proposed in the present invention can provide a performance similar to the conventional cell search technique while reducing the amount of calculation and search time as compared with those using the conventional technique.

As described above, according to the present invention, since the cell search procedure is performed in two separate steps, it is possible to reduce the number of calculations required for performing a cell search. Also, according to the present invention, although a timing offset and/or an integer time frequency offset exists, it is possible to perform the correlation-value calculation procedure for performing a cell search with fewer calculations as compared with that using the conventional art.

Although the prevent invention has been described with respect to an orthogonal frequency division multiple access (OFDMA) scheme according to the IEEE802.16 standard as an example, it can be understood that the present invention may be applied to other systems which obtain frame synchronization in an asynchronous scheme (delay and correlation) by utilizing a repeated preamble pattern. For example, the present invention can be applied to a normal orthogonal frequency division multiplexing (OFDM) system having a repeated preamble pattern.

While the present invention has been shown and described with reference to certain preferred embodiments thereof, it will be understood by those skilled in the art that various changes in form and details may be made therein without departing from the spirit and scope of the invention as defined by the appended claims. Accordingly, the scope of the invention is not to be limited by the above embodiments but by the claims and the equivalents thereof.

What is claimed is:

1. A cell search apparatus in a wireless communication system, the cell search apparatus comprising:
a subcarrier power calculation unit for calculating power of subcarriers according to each segment, when a signal is inserted into one subcarrier of every three consecutive subcarriers in a frequency domain of a preamble signal and summing up the power of subcarriers at the same turn in every three consecutive subcarriers for each turn, and identifying a segment of a cell corresponding to the position of the largest sum, to which a subscriber station belongs; and
a correlation unit for performing a correlation operation between a predetermined number of pseudo-noise (PN) sequences corresponding to the identified segment of the cell and the preamble signal of the frequency domain, thereby outputting correlation values.

2. The cell search apparatus as claimed in claim 1, further comprising a reception unit which receives a preamble signal, converts the received preamble signal into a preamble signal of the frequency domain, and provides the converted preamble signal to both the subcarrier power calculation unit and the correlation unit.

3. The cell search apparatus as claimed in claim 1, further comprising a largest PN sequence selection unit which selects a PN sequence (a largest PN sequence) corresponding to a largest correlation value from among the correlation values.

4. The cell search apparatus as claimed in claim 1, wherein the correlation unit calculates the correlation values using a differential signal of an original signal when a timing offset exists.

5. The cell search apparatus as claimed in claim 1, wherein the correlation unit calculates a combination having a largest correlation value from among combinations between PN sequences corresponding to a selected segment and a frequency offset of integer times, when the frequency offset of integer times exists.

6. The cell search apparatus as claimed in claim 1, wherein the preamble signal of the frequency domain is set to have a pattern of a repeated period in every relevant segment, and the subcarrier power calculation unit calculates the power of $NK^{th}$, $(NK+1)^{th}$, $(NK+2)^{th}$, through $[NK+(N-1)]^{th}$ subcarriers and determines a segment corresponding to a largest power to be the segment to which the subscriber station belongs when the preamble signal has a pattern of an N period.

7. The cell search apparatus as claimed in claim 1, wherein the subcarrier power calculation unit calculates power of subcarriers according to each segment by the equation below, when a signal is inserted into one subcarrier of every three consecutive subcarriers in a frequency domain of a preamble signal:

$$P_{3k} = \sum_{k=0}^{283} \sqrt{I(3k)^2 + Q(3k)^2}$$

$$P_{3k+1} = \sum_{k=0}^{283} \sqrt{I(3k+1)^2 + Q(3k+1)^2}$$

$$P_{3k+2} = \sum_{k=0}^{283} \sqrt{I(3k+2)^2 + Q(3k+2)^2}$$

wherein, $P_{3k}$, $P_{3k+1}$ and $P_{3k+2}$ represent power of $3k^{th}$, $(3k+1)^{th}$ and $(3k+2)^{th}$ subcarrier data, respectively, and I and Q represent I-channel data and Q-channel data, respectively.

8. The cell search apparatus as claimed in claim 3, wherein the correlation unit and the largest PN sequence selection unit calculate correlation values by the equation below and select a largest PN sequence corresponding to a largest correlation value from among the calculated correlation values, when a signal is inserted into one subcarrier of every three consecutive subcarriers in a frequency domain of a preamble signal and the PN sequence includes 284 bits:

$$PN \text{ Sequence} = \underset{n}{\text{MAX}} \sum_{n=0}^{31} \sum_{k=0}^{283} PN_n(k)PR(3k) \quad (\text{MAX Power} = P_{3k})$$

$$\underset{n+32}{\text{MAX}} \sum_{n=0}^{31} \sum_{k=0}^{283} PN_{n+32}(k)PR(3k+1) \quad (\text{MAX Power} = P_{3k+1})$$

$$\underset{n+64}{\text{MAX}} \sum_{n=0}^{31} \sum_{k=0}^{283} PN_{n+64}(k)PR(3k+2) \quad (\text{MAX Power} = P_{3k+2})$$

wherein PR(3k), PR(3k+1) and PR(3k+2), represent $3K^{th}$, $(3K+1)^{th}$ and $(3K+2)^{th}$ subcarrier preamble signal values, respectively, and $PN_n(k)$ represents the value of a $k^{th}$ bit in an $n^{th}$ PN sequence.

9. A method for performing a cell search in a wireless communication system, the method comprising the steps of:

calculating power of subcarriers according to each segment, when a signal is inserted into one subcarrier of every three consecutive subcarriers in a frequency domain of a preamble signal and summing up the power of subcarriers at the same turn in every three consecutive subcarriers for each turn and identifying a segment of a cell corresponding to the position of the largest sum, to which a subscriber station belongs; and correlating a predetermined number of pseudo noise (PN) sequences corresponding to the identified segment in a cell.

10. The method as claimed in claim 9, further comprising the step of receiving a preamble signal and converting the received signal into a signal of the frequency domain.

11. The method as claimed in claim 9, further comprising the step of selecting a PN sequence corresponding to a largest correlation value from among correlation values.

12. The method as claimed in claim 9, wherein, in the correlating step, correlation values are calculated using a differential signal of an original signal when a timing offset exists.

13. The method as claimed in claim 9, wherein, in the correlating step, a combination having a largest correlation value from among combinations between PN sequences corresponding to a selected segment and a frequency offset ($\Delta f$) of integer times is calculated when the frequency offset of integer times exists.

14. The method as claimed in claim 9, further comprising the step of acquiring a cell identifier (ID) from the largest PN sequence.

* * * * *